United States Patent [19]

Tichenor et al.

[11] Patent Number: 4,930,884
[45] Date of Patent: Jun. 5, 1990

[54] EASY VIEWING DEVICE WITH SHIELDING

[75] Inventors: Clyde L. Tichenor, Van Nuys; Paris E. Royo, Yuba City; Alex W. Fleming, San Juan Capistrano, all of Calif.

[73] Assignee: Designs by Royo, San Juan Capistrano, Calif.

[21] Appl. No.: 320,238

[22] Filed: Mar. 3, 1989

Related U.S. Application Data

[63] Continuation-in-part of Ser. No. 180,438, Apr. 12, 1988, abandoned, which is a continuation-in-part of Ser. No. 167,641, Mar. 14, 1988, abandoned.

[51] Int. Cl.$^5$ .............................................. G02B 5/08
[52] U.S. Cl. .................................. 350/624; 350/619; 350/618; 350/631; 350/632
[58] Field of Search ............... 350/618, 619, 623, 624, 350/631, 632, 639, 641; 378/158

[56] References Cited

U.S. PATENT DOCUMENTS

| | | | |
|---|---|---|---|
| 3,536,832 | 10/1970 | Zipse et al. | 178/7.81 |
| 3,549,803 | 12/1970 | Becht et al. | 178/7.88 |
| 3,619,040 | 11/1971 | Rickets | 350/286 |
| 3,620,592 | 11/1971 | Freeman | 350/9 |
| 3,697,154 | 10/1972 | Johnson | 350/174 |
| 3,719,817 | 3/1973 | McCoy et al. | 235/186 |
| 3,723,805 | 3/1973 | Scarpino et al. | 315/27 |
| 3,738,733 | 5/1973 | Pettit | 350/174 |
| 3,784,741 | 1/1974 | Minami et al. | 178/7.88 |
| 3,848,974 | 11/1974 | Hosking et al. | 350/174 |
| 3,914,028 | 10/1975 | Toy | 350/287 |
| 3,915,561 | 10/1975 | Toy | 350/301 |
| 3,923,370 | 12/1975 | Mostrom | 350/55 |
| 3,940,204 | 2/1976 | Withrington | 350/3.5 |
| 4,082,432 | 4/1978 | Kirschner | 350/174 |
| 4,257,677 | 3/1981 | Anderson | 350/174 |
| 4,309,070 | 1/1982 | St. Leger Searle | 350/3.7 |
| 4,360,836 | 11/1982 | Breck | 378/158 |
| 4,451,895 | 5/1984 | Sliwkowski | 364/521 |
| 4,490,745 | 12/1984 | Erickson et al. | 358/250 |
| 4,600,271 | 7/1986 | Boyer et al. | 350/174 |
| 4,605,291 | 8/1986 | Sally | 350/618 |
| 4,647,142 | 3/1987 | Boot | 350/3.7 |
| 4,669,810 | 6/1987 | Wood | 350/3.7 |
| 4,717,248 | 1/1988 | LaRussa | 350/618 |
| 4,759,621 | 7/1988 | Hawkins | 350/623 |
| 4,880,300 | 11/1989 | Payner et al. | 350/618 |

FOREIGN PATENT DOCUMENTS 583761 10/1958 Italy .

Primary Examiner—Bruce Y. Arnold
Assistant Examiner—Jay Ryan
Attorney, Agent, or Firm—Christie, Parker & Hale

[57] ABSTRACT

A computer monitor viewing device is provided which locates a monitor image at a comfortable viewing location and which is desirably suitable for use by most computer users and, in particular, by bifocal users. The device includes a first mirror positioned to reflect an image from a computer monitor screen and a second mirror which is positioned to reflect the image reflected by the first mirror toward the eyes of a viewer. Supports are also provided for positioning the first and second mirrors. Desirably, where the device is used in connection with a keyboard, the second mirror is positioned closer to the keyboard than the computer monitor screen, thereby allowing users, including bifocal wearers, to comfortably view the screen and the keyboard simultaneously. The device may also incorporate means to shield the user from radiation from the computer monitor.

37 Claims, 7 Drawing Sheets

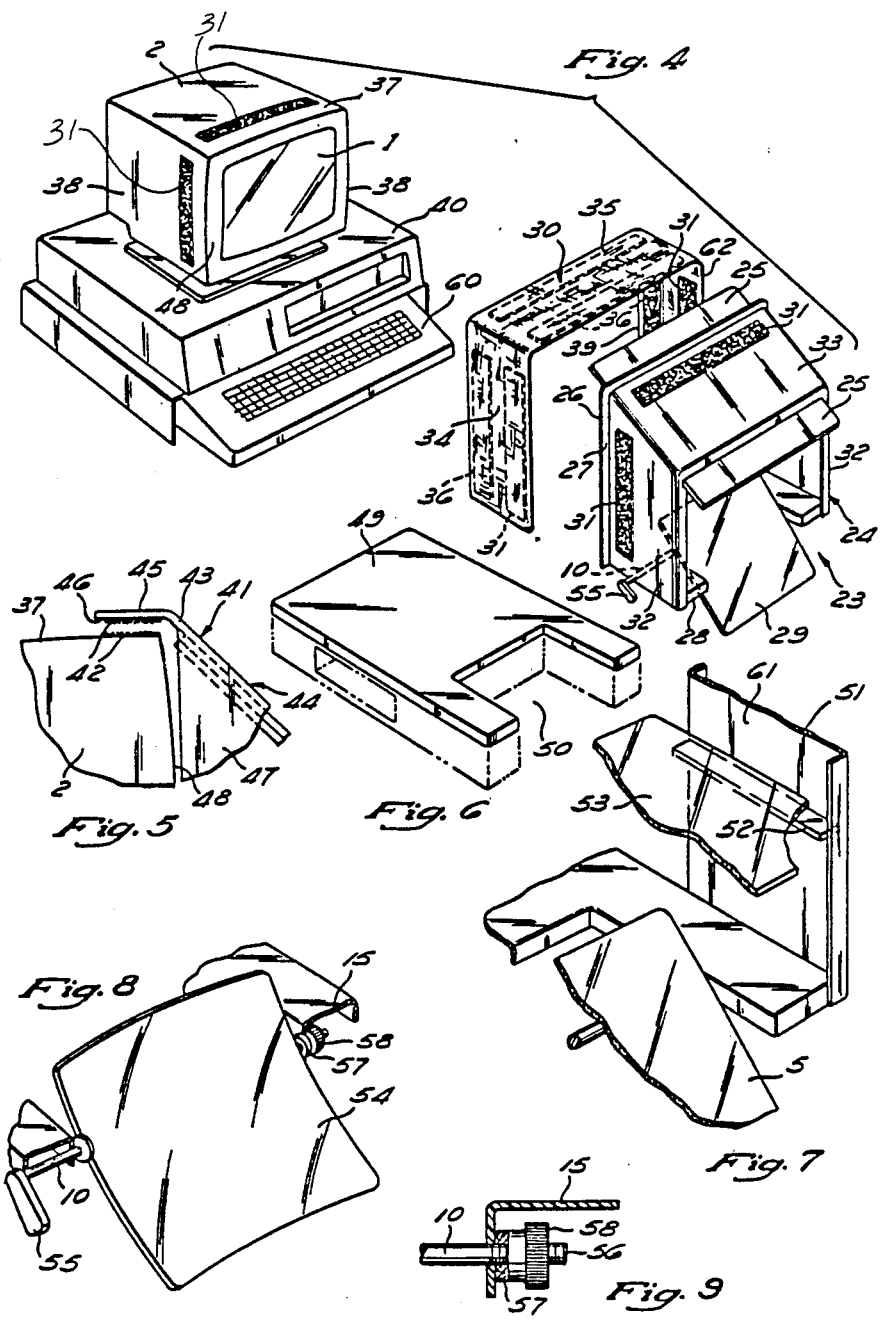

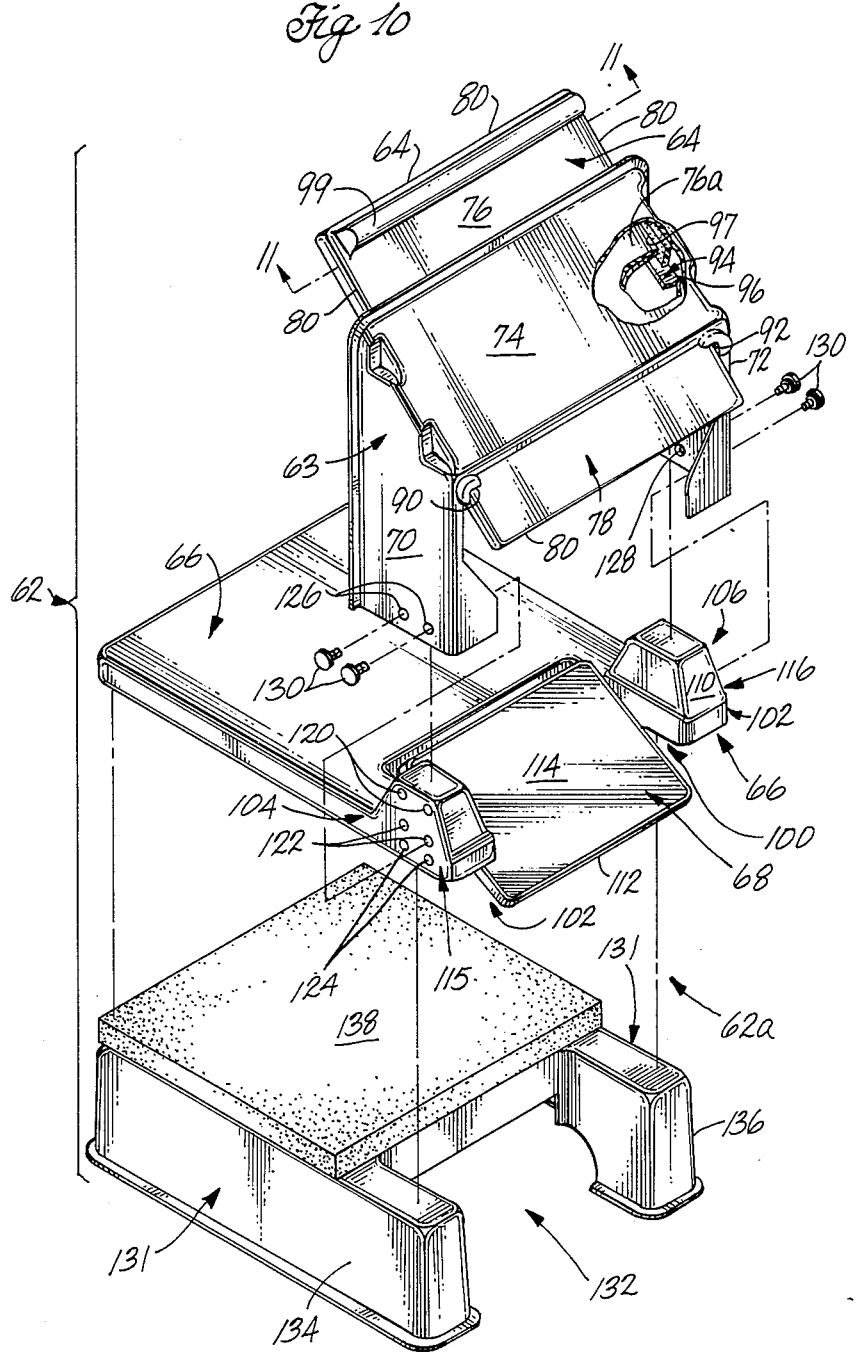

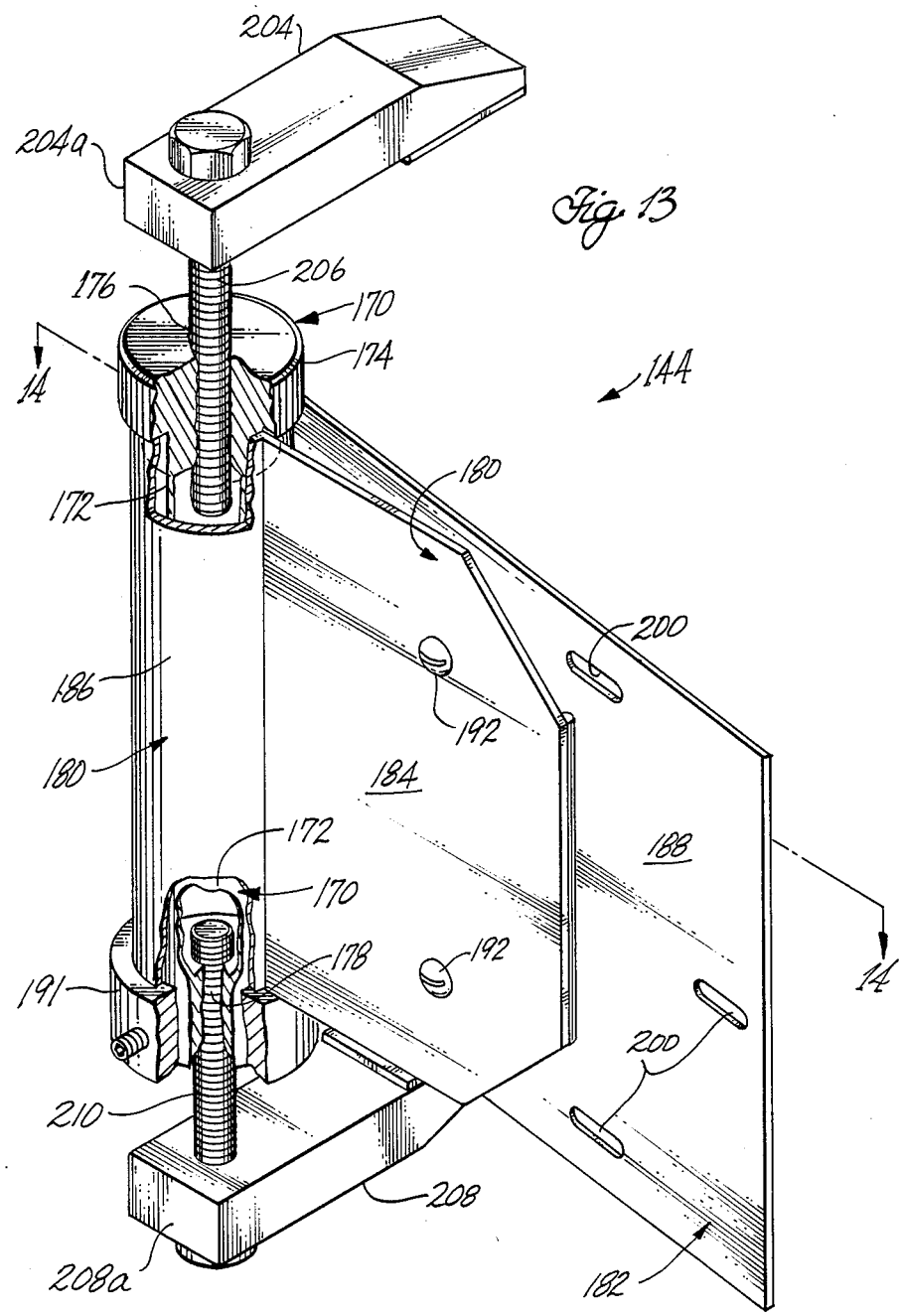

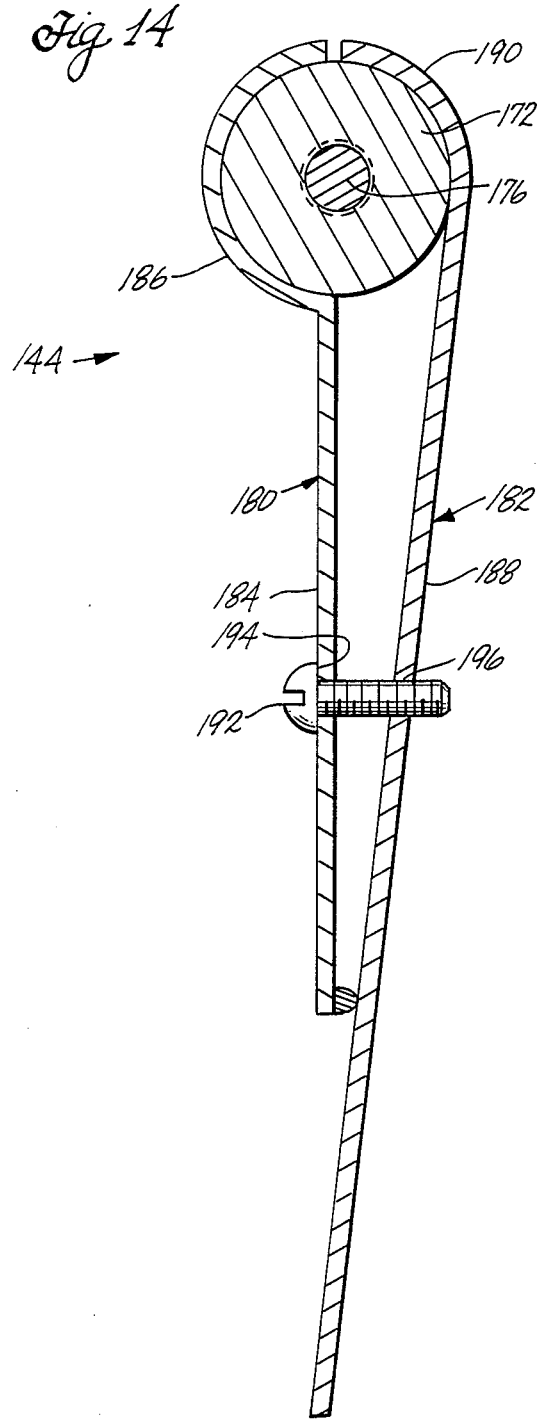

EASY VIEWING DEVICE WITH SHIELDING

RELATED APPLICATIONS

This is a continuation-in-part of application Ser. No. 07/180,438, now abandoned filed Apr. 12, 1988, which is a continuation-in-part of parent application Ser. No. 07/167,641, now abandoned filed Mar. 14, 1988, all filed under the title EASY VIEWING DEVICE WITH SHIELDING. The disclosures of applications Ser. Nos. 07/180,438 and 07/167,641 are incorporated herein by this reference.

FIELD OF THE INVENTION

This invention relates to devices which enhance an operator's comfort and safety when viewing video display terminals, such as computer monitors.

BACKGROUND OF THE INVENTION

Computers and their associated video display terminals (computer monitor screens) are used extensively in the workplace in association with many tasks, such as accounting, word processing, and the like. Individuals who use computers are sometimes required to use them continuously for long periods of time.

Prolonged viewing of computer monitor screens often results in eyestrain, burning sensations in the eyes, fatigue and headaches. Eyestrain and the burning sensation associated with prolonged viewing appear to be caused both by glare and by the eye muscles of the viewer attempting to converge the eyes to the near point image on the screen. It has been determined that, when an individual looks straight ahead, for example, at a computer monitor screen, the natural tendency of the eye muscles is to cause the eyes to diverge for distance vision. Therefore, in order to focus on a computer monitor screen at the normal viewing distance of from 18 to 25 inches while looking straight ahead, the eye muscles are strained to converge the eyes. Conversely, when an individual looks downward at a 20°-30° angle, or so, the eyes naturally converge for near vision. In addition to eyestrain caused by attempting to focus on a computer monitor, persons using bifocals are forced to tilt their heads up toward the ceiling in order to view the screen through their bifocal segment. Tilting the head is uncomfortable and causes fatigue. Eyestrain and fatigue can result in headaches.

In addition to complaints of eyestrain, fatigue and headaches, the cathode ray tubes which are incorporated into computer monitors emit electromagnetic radiation which may be harmful to a user when the user is exposed to such radiation for continuous prolonged periods of time.

There is, therefore, a need for a device configured to reduce the glare associated with viewing a computer monitor screen and disposed to be positioned so that the operator can read the information being displayed while looking downwardly, for example, at an angle of 20°-30°, instead of straight ahead. It is also desired to enhance the computer operator's safety by providing a viewing device that is configured to reduce the problem of longterm exposure to radiation from video display terminals.

SUMMARY OF THE INVENTION

A device is provided in accordance with practice of principles of this invention that enhances the safety and comfort of an operator when viewing a computer monitor screen, thereby increasing operator productivity. The viewing device includes a first mirror positioned to reflect an image from a computer monitor screen and a second mirror which is positioned to reflect the image reflected by the first mirror toward the eyes of the viewer. Supports are provided for positioning the first and second mirrors, as desired. The second mirror is positioned so that the operator can see the image in the mirror by looking down at a 20° to 30 ° angle. This promotes the comfort of the user by reducing eyestrain and associated headaches. Such positioning also enables a bifocal wearer to view the screen without tilting his head upward. Preferably, when the viewing device is used in conjunction with a keyboard, the second mirror is positioned so that the user can comfortably view the screen and the keyboard simultaneously without moving the head. Being able to view the screen and keyboard without moving the head reduces fatigue.

It is preferred that either the first or second mirror is a transparent mirror, and, more preferably, that both the first and second mirrors are transparent mirrors. The term "transparent mirror" or "partial mirror" as used herein means a mirror that reflects a first portion of light incident to it and transmits a second portion of the light.

It has been found that the use of transparent mirrors in the viewing device provided in accordance with this invention reduces glare and improves contrast, thereby enhancing the comfort of the user and enabling the user to view the computer screen for substantially longer periods of time without suffering eyestrain, burning sensations in the eyes, fatigue, and headaches.

Preferably, at least one of the first and second mirrors is a front surface reflecting mirror, and, most preferably, both mirrors are front surface reflecting transparent mirrors. The term "front surface mirror" or "front surface reflecting mirror" as used herein means a mirror which has its mirrored or reflective surface on the face of the glass nearest the viewer. The use of a front surface mirror eliminates the problem of double image and distortion that is inherent in using standard back or rear surface mirrors.

BRIEF DESCRIPTION OF THE DRAWINGS

These and other features of the invention will now be described with reference to drawings of preferred embodiments which are intended to illustrate and not to limit the invention and in which:

FIG. 4 is an exploded perspective view illustrating a second preferred embodiment of a device for viewing a computer monitor screen provided in accordance with practice of principles of the present invention;

FIG. 5 is a partial side view illustrating an alternative means of fastening viewing devices provided in accordance with practice of principles of the present invention to a computer monitor;

FIG. 6 illustrates a support for a computer monitor for use in connection with viewing devices provided in accordance with practice of principles of the present invention, with an alternative embodiment illustrated in phantom;

FIG. 7 is a partial perspective view illustrating another preferred embodiment of a device provided in accordance with practice of principles of the present invention which incorporates a magnifying lens;

FIG. 8 is a partial perspective view illustrating another preferred embodiment of a viewing device provided in accordance with practice of principles of the present invention, incorporating a mirror having a concave reflecting surface;

FIG. 9 is a view in partial cross-section illustrating the frictional brake mechanism of the viewing device of FIG. 8;

FIG. 10 is a semi-schematic exploded perspective view of another preferred embodiment of a device for viewing a computer monitor screen provided in accordance with practice of principles of the present invention;

FIG. 13 is semi-schematic perspective view, in partial cross-section, of a pivot clamp assembly provided in accordance with practice of principles of the present invention; and FIG. 14 is a cross-sectional view taken on line 14—14 of the pivot clamp assembly of FIG. 13.

DETAILED DESCRIPTION

Figure 2:
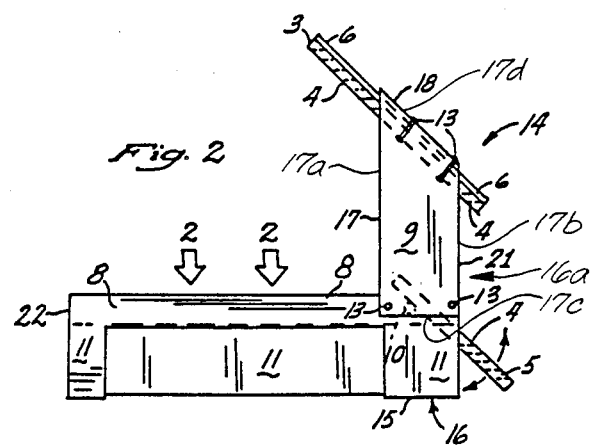
FIG. 2 is a side elevational view of one preferred embodiment of a device provided in accordance with practice of principles of the present invention for viewing a computer monitor screen.

Referring to FIG. 2, there is shown a side elevational view of one preferred embodiment of a device 14 provided in accordance with practice of principles of the present invention for viewing a computer monitor screen (not shown). In this embodiment, the device 14 includes a generally L-shaped mounting unit 16 which supports a first mirror 3 above a second mirror 5 which may be smaller or larger than first mirror 3. In a preferred embodiment, the mirrors 3 and 5 are transparent front surface mirrors.

Figure 1:
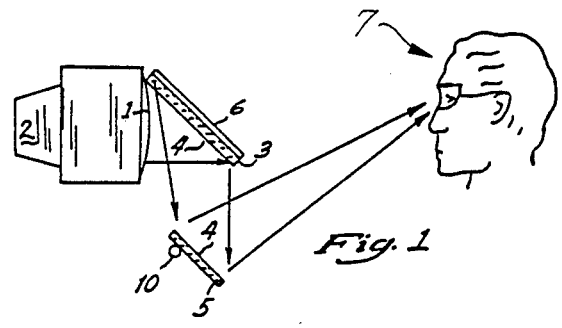
FIG. 1 is a schematic view illustrating the reflection of an image on a computer monitor screen toward the eyes of a viewer by a device provided in accordance with practice of principles of the present invention.

Referring to FIG. 1 in addition to FIG. 2, the viewing device 14 is designed for use with a video display terminal, e.g., a computer monitor 2 incorporating a screen 1. The image on the screen 1 is reflected, as shown by the arrows (FIG. 1), by the front reflecting surface 4 of the first front surface mirror 3 toward the front reflecting surface 4 of the second front surface mirror 5. The second mirror 5 is shaped and positioned to reflect the image reflected by the first mirror 3 toward the eyes of the viewer 7, also as shown by the arrows. Preferably, the second mirror 5 is positioned so that, when the viewer is seated in his normal position for using a computer, he can look downwardly at an angle of 20° to 30° to see the image in the second mirror. As is described above, by looking downwardly at this angle, instead of straight ahead, fatigue is reduced.

The first mirror 3 is preferably backed by a lead radiation shield 6, or by a material other than lead suitable for absorbing radiation emitted by the monitor screen. The second mirror 5 may also have a radiation shield. If desired, radiation absorbing material may be incorporated into the mirrors and the shield eliminated.

It is not necessary that the first mirror is larger than the second mirror. However, as is readily understood by reference to FIG. 1, since, in the illustrated embodiment, the distance the image travels from the monitor screen to the second mirror is greater than the distance traveled from the monitor screen to the first mirror, the size of the image reflected by the second mirror will be smaller than the image reflected by the first mirror. Since the reflection of this image will require less reflective surface area than is needed in the first mirror to reflect the image directly from the monitor screen, it will generally be desirable to utilize a second mirror that is smaller than the first mirror to minimize both the cost and weight of the viewing device 14.

In preferred embodiments, when the viewing device of this invention is in position for viewing a computer monitor screen, the optical path length from the center of the monitor screen to the center of the first mirror is about 3 to 5 inches, the path length from the center of the first mirror to the center of the second mirror is about 7 to 11 inches, and the path length from the second mirror to a viewer seated in a normal or first viewing position is from about 17 to 24 inches. In these preferred embodiments, the total optical path length from the center of the computer monitor screen through the mirror system and to the eyes of the viewer is from about 27 to about 40 inches.

The eyes of an observer viewing the same monitor screen directly while seated in the same normal or first viewing position are, on average, about 18 to 25 inches from the monitor. Thus, when the monitor screen is viewed using the viewing device provided in accordance with the invention by an observer seated at a first position, the optical path length is about 9 to 15 inches longer than the optical path length when the screen is viewed directly by the observer seated at the same first position. The about-9-to-15-inch extension in optical path length makes the image easier to read for persons whose eyes have lost the ability to focus on images having a short viewing distance, i.e., images with a short optical path length, and thus reduces eyestrain. In embodiments of the viewing device which incorporate a magnifying lens between the first and second mirrors, a relatively larger second mirror may be utilized.

Although the first and second mirrors 3 and 5, respectively, can be either front or back surface mirrors, it is preferred that at least one, and preferably both, is a front surface mirror. Back surface mirrors create a double image which distorts the images being reflected to the viewer from the computer monitor screen. Conversely, the image from a front surface mirror is not distorted and, hence, is easier and more comfortable to view.

It is also preferable that at least one, and more preferably both, the first and second front surface mirrors 3 and 5, respectively, is transparent. Transparent front surface mirrors useful in practice of the present invention are, for example, supplied by Libby-Owens-Ford Company under the trademark "Eclipse Mirropane E.P." For example, a one-quarter-inch-thick, grey "Eclipse Mirropane E.P."mirror has a daylight transmittance of 13%, a daylight reflectance of 60%, and an absorption of 27%.

It was surprisingly found that, when front surface transparent mirrors, such as the "Eclipse Mirropane E.P." mirrors, are used, the reflected image appears somewhat darkened due to absorption of glare, and the contrast of the image is improved. The absorption of glare is further enhanced by providing a coating of black paint on the rear surface of the transparent mirror. Thus, the use of such transparent mirrors is easier on the eyes and enhances the ability of an individual to view a computer monitor screen for longer periods of time than is possible when standard (non-transparent) mirrors are used. Furthermore, it has been determined that transparent mirrors, such as the "Eclipse Mirropane E.P." mirrors, which are made by depositing a vaporized metal such as chromium onto the semi-molten surface of a ribbon of float glass in a pyrolytic process, are substantially more scratch-resistant than standard front surface mirrors.

Finally, although more than two mirrors could be incorporated into a viewing device provided in accordance with principles of this invention, using only two mirrors is desirable in that this tends to minimize the cost of the unit while providing a non-inverted image for the viewer.

Figure 3:
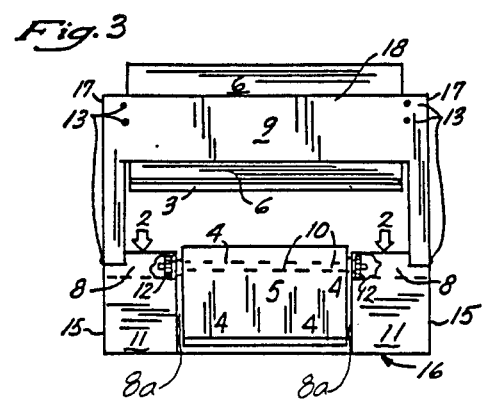
FIG. 3 is a front elevational view of the device of FIG. 2.

Referring now to FIGS. 2 and 3, the mounting unit 16 desirably includes an upright support 9 joined at its bottom end 21 to a horizontal base member 8. As is described below in greater detail, the base member 8 can be in the shape of a relatively thin flat plate or can be provided with extensions which raise it from the surface. The base member 8 is rectangular in horizontal cross-section and has a rectangular notch 8a (best seen in FIG. 3) in the middle of its front end forming a pair of parallel arms 15 spaced sufficiently apart horizontally to receive the second mirror 5. The upright support 9 desirably includes a pair of trapezoidal sides 17 having a pair of vertical edges 17a and 17b, a horizontal bottom edge 17c, and an upper edge 17d which forms a 45° angle with the base member 8 of the support 9 so as to angle downward toward the front end 16a of the mounting unit 16. The upper edges 17d of the trapezoidal sides 17 are joined by a flat rectangular connecting member 18. The connection between base member 8 and the upright support 9 may be adjustable vertically or horizontally so to better fit different size monitors.

The first mirror 3 is advantageously supported between the trapezoidal sides 17 of the upright support 9 of the mounting unit 16 against the underside of the connecting member 18 by means of suitable fasteners 13, such as clamps, screws or rivets, or the like, and may be adjustable. The first mirror's reflective surface 4 thus faces away from the connecting member 18, forming a 45° angle with the horizontal and angling downward toward the front end 16a of the mounting unit 16. It is preferred that the first mirror be at a 45° angle to provide maximum reflectivity of the image from the vertical monitor screen. This enhances image definition and makes viewing easier. The bottom, or second mirror 5, is advantageously secured near one of its ends to a cylindrical horizontal pivot 10 which extends through the arms 15 of the base member 8. The pivot 10 is sufficiently spaced from the bottom of the device 14 to permit the second mirror 5 to rotate about the pivot 10 to provide a wide range of adjustability. This permits the user to change the viewing angle of the image reflected to accommodate a variety of user sitting positions and heights. Although the first mirror could also be adjustable, it is generally simpler to align the mirrors for proper viewing simply by rotating the second mirror to the proper position while leaving the first mirror in place.

The sides 17 of the upright support 9 and the shielded first mirror 3 substantially block an image on the screen 1 from the view of one positioned to the side or above the monitor screen 1. On the other hand, the intended viewer 7 can desirably direct the image directly toward his or her eyes by adjusting the position of the second mirror 5. The image reflected by the second mirror 5 is provided with a higher contrast and less glare than the image on the screen 1 by means of using the transparent front surface mirrors 3 and 5, as is described above.

When the device 14 is used with a computer monitor which is removably seated on top of a computer housing, as, for example, is shown in FIG. 4, the base member 8 is in the form of a thin, rigid plate which can be inserted between the computer housing and the monitor. Conversely, when the monitor 2 is to be seated directly upon the top of a desk, the horizontal base member 8 incorporates extensions 11 so that it forms a box-like member which can be used for additional storage space and to provide a means for spacing the pivot 10 above the surface of the desk top. In either embodiment, the device is quickly and easily installed beneath the monitor so that the weight of the monitor acts as a counterbalance to prevent the overhanging mirrors from tipping.

Referring now to FIG. 4, there is shown a device 23 for viewing the screen 1 and computer monitor 2. The device 23 includes an upright support 24 for positioning a first mirror 25 virtually identical to the upright support 9 of the device 14 of FIGS. 2 and 3, except that the rear end 26 of the upright support 24 is provided with an outer flange 27 to provide added rigidity. The horizontal base member 28 of the device 23 includes a notch for receiving a second mirror 29. The base member 28 differs from the base member 8 of the embodiment of FIGS. 2 and 3 in that it terminates at roughly the rear end 26 of the upright support 24. The angle of the second mirror 29 is desirably adjustable by means of a lever 55 extending through the sides of the mounting unit, enabling the pivot 10 to be rotated about its axis. Although the second mirror 5 of the device 14 shown in FIG. 2 could be rotated about the axis of the pivot 10 with one's fingers, the lever 55 is desirable in that it prevents the mirror 29 from being smudged by fingerprints.

Both the first and second mirrors 25 and 29, respectively, in FIG. 4 may be secured in a tray or other suitable holder (not shown). The mirror 25 may be configured to be adjustable so as to slide backward or forward on the upright support 24 so as to be compatible with different-size monitors.

The viewing device 23 is attached to the monitor 2 (shown in FIG. 4) by means of a three-sided joining member 30 which is secured to the device 23 by mating hook and loop fasteners 31, such as those provided under the trademark "VELCRO." The hook and loop fasteners are preferably secured to the outside surface of the sides 32 of the upright support 24 and to the outside surface of a member 33 which connects the sides 32. Such hook and loop fasteners are also on the inside surfaces of the side portions 34 of the three-sided joining member 30, and on the inside surface of a portion 35 which connects the sides 34.

The joining member 30 is preferably made of fabric, but can readily be made of other materials, such as foam or plastic. The joining member 30 is connected to the monitor 2 by a suitable means of fastening, such as mating hook and loop fasteners 31, which are preferably secured to the top 37 and sides 38 of the monitor 2 and on the inside surfaces of the side portions 34 and connecting portion 35 of the rear inside edge 36 of the member 30. The joining member 30 forms a hood to block ambient light from the mirrors 25 and 29 of the viewing device 23.

FIG. 6 illustrates a base member 49 for use with the device 23 of FIG. 4. The generally rectangular base member 41 may be relatively flat with a rectangular notch 50 for receiving the second mirror 29 of the device 23, or may be several inches tall, or may be in different shapes and sizes to act as a spacer to accommodate different size monitors and form a rectangular storage space beneath the monitor (shown in phantom). As can be appreciated from FIG. 4, the image reflected by the second mirror 29 will be closer to the keyboard 60 than the computer monitor screen 1, thereby making it easier for all users, including bifocal wearers, to view the screen 1 and the keyboard 60 simultaneously.

Turning to FIG. 5, there is shown a partial side view of another embodiment of a viewing device 41 useful when the computer monitor is permanently attached to the computer or when the monitor is sitting directly on a desk. The device 41 is directly secured to the monitor 2 by fasteners 42. The connecting member 43 of the upright support 44 of the viewing device 41 is provided with a projection 45 which rests substantially flat above the top 37 of the monitor 2 during use. The device 41 hangs from and is secured to the top 37 of the monitor 2 by suitable fasteners 42, such as mating hook and loop fasteners which are secured to the top 37 of the monitor 2 and to the underside 46 of the projection 45, respectively. Preferably, the sides 47 of the upright support 44 of the viewing device 41 rest against the front portion 48 of the monitor 2 which surrounds the screen 1, to thereby prevent movement of the device 41 relative to the monitor 2. This decreases the level of shear forces on the fasteners 42.

FIG. 7 illustrates yet another embodiment of the invention wherein the interior faces 61 of the sides 51 of the upright support are provided with inwardly extending horizontal ribs 52 for supporting a magnifying lens 53 for magnifying the image reflected by the first mirror 3 so that the image reflected by the second mirror 5 will be larger. The lens could also be used to shrink the image and, depending upon the desired application, various biconcave or biconvex lenses could be utilized. These lenses may be fresnel and may be made of glass, plastic, or other suitable material. These lenses may also incorporate radiation absorbing material, if desired. The position of the ribs is preferably such that the image on the second mirror is magnified or reduced, as desired, and properly focused.

Referring now to FIG. 8, the viewing device provided in accordance with this invention may incorporate a second mirror 5 having a concave reflective surface 54 so that the image reflected by the second mirror toward the eyes of the viewer will be magnified.

Referring now to FIG. 9, to prevent the second mirror 5 from rotating once it has been adjusted, the threaded end 56 of the pivot 10 opposite the lever 55 is provided with a frictional brake 57, of cork or other suitable material, which presses against the pivot 10 when compressed by a knob 58 to resist the rotation of the pivot 10 and, therefore, the mirror 5 in either direction. The braking system may also be a cup brake, a gear coupled brake or other suitable system that will allow the second mirror 5 to stay in an adjusted position. The braking system tension may be adjustable to allow a tension suitable to the user. Since the position of the second mirror must be changed frequently, for example, to move it out of the way to change computer disks, it is important that a frictional brake, such as the brake 57, be provided instead of a system which must be loosened and then tightened each time the mirror must be moved. The frictional brake system is substantially easier to use and less tiring for the operator.

Figure 11:
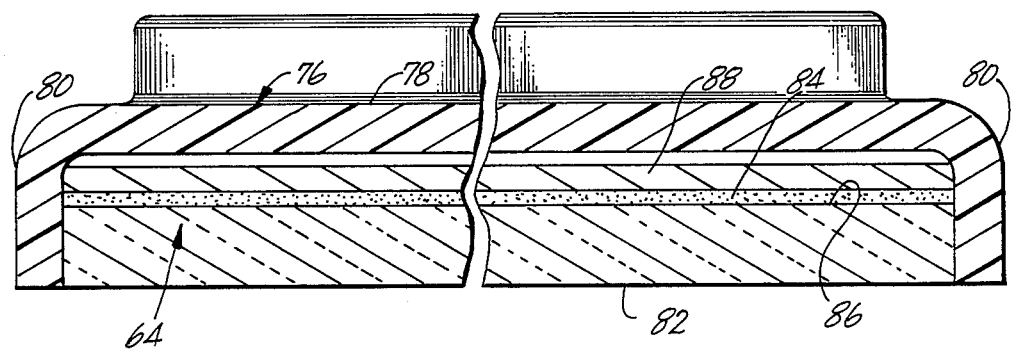
FIG. 11 is a semi-schematic cross-sectional view taken on line 11—11 of FIG. 10.

Referring to FIGS. 10 and 11, there are shown, respectively, a semi-schematic, exploded, perspective view and cross-sectional views of another preferred embodiment of a device 62 provided for viewing a computer monitor screen. (The computer monitor screen is not shown). The device 62 includes a support or mounting structure 63 for mounting a first mirror 64, with the support 63 mounted onto a base member 66 on which a second mirror 68 is mounted. As is described below in greater detail, the means for supporting and positioning the first mirror 64, i.e., the support 63, and the means for supporting and positioning the second mirror 68, i.e., the base 66, provide a single mounting structure when the support 63 is on the base 66. As was the case with the previous embodiments, the first mirror is provided to reflect the image from a computer monitor screen to the second mirror, from which the image is reflected to the eyes of the viewer. Furthermore, the device 62 is configured so that the second mirror can be adjusted to provide that when a viewer is seated in his normal position for using a computer, he can look downwardly at an angle of 20° to 30°, or so, and see the image in the second mirror.

The support 63 comprises a pair of spaced-apart, vertical, left and right sides 70 and 72, respectively, when viewing the device 62 from the front 62a, connected at their tops by a connecting member 74. In a preferred embodiment, the first mirror 64 is mounted in a housing 76, which in the illustrated embodiment has a rectangular, inverted-tray shape having a flat surface 78 with four sides 80 extending perpendicularly downwardly away from the surface 78. The mirror 64 of the preferred embodiment is an "Eclipse Mirropane E.P." mirror with a reflecting front surface 82 (best seen in FIG. 11) and is provided with a coating 84 of black paint on its back non-reflecting surface 86. Preferably, a thin lead film or foil 88, which extends over the entire cross-sectional area of the mirror 64, is between the mirror and the flat surface 78 of the mirror housing 76. The coating 84 of black paint has been found to maximize reduction of glare from transparent front surface mirrors, thereby enhancing the comfort of the computer operator. The lead foil absorbs any harmful radiation that may be emitted from the cathode ray tube of the computer monitor, to shield the operator from harmful radiation. If desired, the lead foil can be deleted and a leaded blanket or the like (not shown) can be draped over the back of the mirror housing and connecting member 74 to provide a radiation shield. Alternately, a lead paint can be used in place of the lead foil, or lead may be added to the material, such as plastic, which forms the housing.

The mirror housing 76 is slidably mounted in channels 90 and 92 on opposite sides of the support 63 at its top. The channels 90 and 92 are defined by a pair of support brackets 94 (only one of which is shown)

mounted on the inside surfaces of the left and right sides 70 and 72 of the support 63. Each support bracket 94 has a top surface 96 on which the edges 76a of the mirror housing slides. The channels 90 and 92 are formed between the top surface 96 of the bracket 94 and the inner surface 74a of the connecting member 74. The mirror housing 76 is held snugly in frictional engagement in the channels 90 and 92 by means of a resilient material 97, such as a plastic foam, sponge rubber, or the like, which is provided in at least one of the channels 90 and 92 extending between the top surface 96 of the bracket 94 and the inside surface 74a of the connecting member 74. The edge 76a of the mirror housing 76 is frictionally engaged with the resilient material 97, which acts as a frictional brake so that the mirror housing 76 stays in place unless a force is applied to the mirror housing to move it. For example, the mirror 64 and its associated housing 76 can be adjusted by pushing the housing up or down within the channels 90 and 92. This can be efficiently accomplished by using the finger hold 99 which extends horizontally across the top of the back surface of the mirror housing 76. When the mirror has been moved to its desired position, it will stay in place by means of the frictional engagement with the resilient material 97. Preferably, the support is configured so that the first mirror 64 is at an angle of about 45° to vertical.

The base member 66 is rectangular in horizontal cross-section with a notch 100 in its front end 102, which is configured to receive the second mirror 68. The notch 100 is defined by a pair of spaced-apart left and right extensions 104 and 106, respectively. The extensions 104 and 106 comprise four-sided, truncated, pyramid-shaped sections 108 and 110 extending vertically from their forward ends.

The second mirror 68 is mounted in a mirror housing 112, with the front surface 114 of the mirror 68 facing out from the housing. As was the case with the first mirror 64, it is preferred that the second mirror is a transparent front surface mirror, such as the "Eclipse Mirropane E.P." mirrors described above. Furthermore, the second mirror 68 has a layer (not shown) of black paint on its back surface, similar to the black coating layer 84 on the back surface of the first mirror 64.

The mirror housing 112 is mounted on a pivot assembly (not shown) similar to the pivot assembly 10 described above with reference to the previous embodiments. Thus, the angle of the second mirror 68 can be adjustable by being rotated about the pivot axis. The pivot of this embodiment incorporates the frictional brake as is described with reference to FIGS. 8 and 9. Thus, when the second mirror 68 of this embodiment is adjusted to its desired position, it remains in that position until adjusted further.

In an exemplary embodiment, there are three vertically-spaced-apart sets 120, 122, and 124 of two horizontally-spaced-apart holes in both of the outside walls 115 and 116 of the left and right pyramid-shaped sections 108 and 110. (Only the holes in the wall 115 of the section 108 are shown.) The support 63 has pairs 126 and 128 of horizontally-spaced-apart holes in the bottom of its left and right sides 70 and 72, respectively. The support 63 is adjustably mounted onto the base member 66 by lining up the desired set of holes 120, 122, or 124 with the holes 126 and 128 in the sides 70 and 72 of the support 63, and by inserting mounting pins 130 through the lined-up holes. Thus, the height of the support 63 can be adjusted up or down, as desired, by lining up the desired sets of holes 120, 122, or 124. This provides a means for adjusting the height of the first mirror relative to the second mirror and enables the device 62 to be useful with different-size computer monitors. If desired, more or fewer than three sets of holes can be provided in the base member.

As was the case with the base member 49 illustrated in FIG. 6, the generally rectangular base member 66 is relatively flat and is configured for placement between a computer monitor and its associated computer so that the monitor acts as a counterbalance for the weight of the support 63 and its associated overhanging first and second mirrors 64 and 68.

When a computer monitor is not to be positioned on a computer, the base member 66 can be mounted directly onto a pedestal unit 131, which, in the illustrated embodiment, is rectangular in shape and has a notch 132 in its front end defined by a pair of spaced-apart left and right extensions 134 and 136, respectively. The pedestal unit 131 is provided to position the support 63 and associated base member 66 of the viewing device 62 at the proper height when the device 62 is not elevated by placement on top of a computer. The notch 132 accommodates the second mirror 68 and allows the mirror to be pivoted to its desired position.

In the illustrated embodiment, the base member 66 is hollow, and a piece of plastic foam 138 or other like material, formed to fit within the hollow portion of the base 66, is provided so that the base will be in a stable relationship when it is mounted on the pedestal unit 131.

Figure 12:
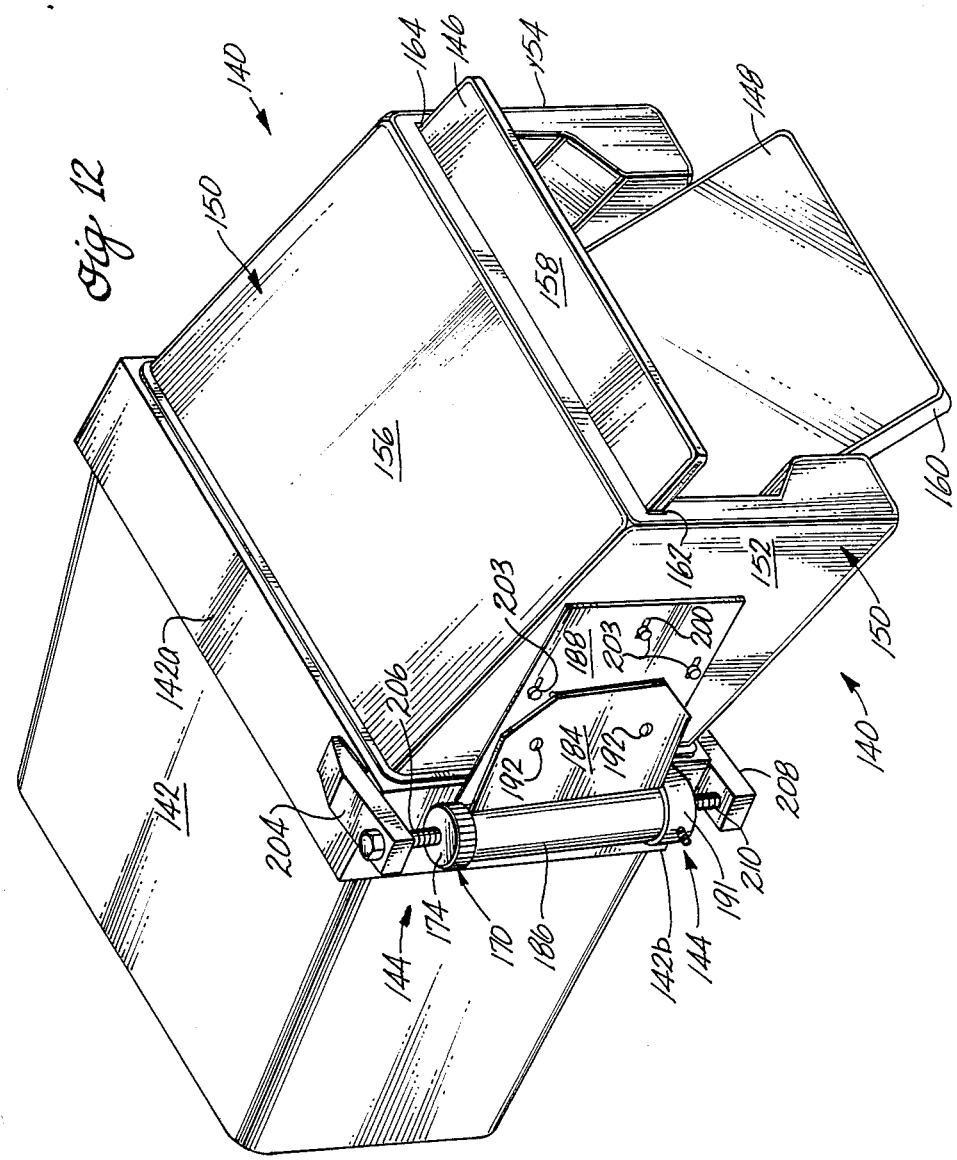
FIG. 12 is a semi-schematic perspective view of another preferred embodiment of a device for viewing a computer monitor screen provided in accordance with practice of principles of the present invention which incorporates a pivot clamp assembly configured to pivot the viewing device into a first position so that the screen can be viewed using the device and into a second position so that the screen can be viewed directly.

Turning to FIG. 12, there is shown a semi-schematic perspective view of yet another preferred embodiment of a device 140 provided in accordance with practice of principles of the present invention for viewing the screen (not shown) of a computer monitor 142. Turning additionally to FIGS. 13 and 14, the viewing device 140 incorporates a pivot clamp assembly 144, which is configured to swing or pivot the device 140 into a first position (as is shown in FIG. 12) for viewing a computer screen by means of first and second mirrors 146 and 148, respectively, and, as is described below in greater detail, into a second position, away from in front of the screen so that the computer screen can be viewed directly. The viewing device 140 incorporates a support 150 which comprises left and right sides 152 and 154 connected at their tops by a connecting member 156. The first mirror 146 and the second mirror 148 are preferably transparent front surface mirrors and are mounted in housings 158 and 160, respectively, which are similar to the housings described above with reference to FIGS. 10 and 11. Preferably, the mirror 146 has a lead foil (not shown) between its back surface and the viewer, and both of the mirrors 146 and 148 incorporate a coating of black paint on their back surfaces.

The housing 158 slides in channels 162 and 164 formed beneath the connecting member 156 along the top inside portions of the walls 152 and 154 of the support 150. The channels 162 and 164 are defined by components similar to those which provided the channels 90 and 92 of the embodiment described in FIGS. 10 and 11. Thus, the first mirror 146 and its associated housing 158 can be moved within the channels to a desired position by sliding it in and out, as appropriate.

The second mirror 148 and its associated housing 160 are mounted on a pivot system (not shown) similar to the pivot system 10 described in the previous embodiments. Thus, the mirror 148 can be adjusted by pivoting it around a pivot in the same manner as the second mirror of the previous embodiments was adjusted. In a preferred embodiment, the first and second mirrors are transparent front surface mirrors, such as the "Eclipse Mirropane E.P." mirrors provided by Libby-Owens-Ford and described above.

Turning particularly to FIG. 13, the pivot clamp assembly 144 provided in accordance with this invention comprises a hinge pin 170 which comprises a shaft 172 with a knurled knob 174 on its top end. A threaded hole 176 is through the knurled knob and extends into the top center of the shaft along its length. A threaded hole 178 extends into the bottom center of the shaft along its length. The holes 176 and 178 are each about one-third as long as the shaft. First and second hinge sections 180 and 182, respectively, are mounted onto the shaft below the knurled knob and extend outwardly therefrom. Turning particularly to FIG. 14, the first hinge section 180 is formed of a flat plate portion 184 on one end, having a portion 186 in the shape of one half-cylinder on its opposite end. The second hinge portion 182 incorporates a flat plate section 188 on one end, with curved section 190 on its other end. As is best seen in FIGS. 13 and 14, the cylindrical portion 186 and the curved section 190 are shaped and sized so that they can be positioned along the length of the shaft on its opposite sides, with the flat portions extending next to each other and away from the shaft. A collet 191 (shown in FIGS. 12 and 13) is mounted on the bottom of the shaft 172 which holds the portions 186 and 190 of the hinge sections in place vertically on the shaft. Screws 192 extend through holes 194 and 196 in plates 184 and 188, respectively. A plurality of holes 200 (in this case, three) are through the flat plate portion 188 of the hinge section 182 for use in mounting the pivot clamp onto the side 202 of the viewing device 140 by means of screws 203 (shown in FIG. 12). A clamp 204 is mounted onto the top of the pivot clamp assembly by means of a bolt 206 which extends through one end 204a of the clamp 204 and into the threaded hole 176. A clamp 208 is mounted onto the bottom of the pivot clamp assembly by means of a bolt 210 which extends through one end 208a of the clamp 208 and into the threaded hole 178. As is best seen in FIG. 12, the device 140 is mounted onto the computer monitor 142 by securing the clamps 204 and 208 onto the top 142a and bottom 142b of the monitor 142.

When the viewing device 140 is mounted on the monitor 142, it can be swung into position, as shown in FIG. 12, for viewing the computer monitor screen via the second mirror 148 or, conversely, it can be swung away from the computer monitor screen by means of the pivot clamp assembly 144 so that the screen can be viewed directly. The resistance of the hinge sections 180 and 182 to pivoting or turning on the hinge pin 170 can be adjusted by loosening or tightening the screws 192. For example, when the screws 192 are loosened, the hinge sections will move relatively more freely on the shaft 172 of the hinge pin 170, and, conversely, when the screws 192 are tightened, the hinge sections will move relatively less freely.

The viewing device 140 can also be moved up and down relative to the computer monitor by screwing the knurled knob 174 in one direction or the other. For example, when the knurled knob 174 is screwed downwardly along the bolts 206 and 210, the shaft 172 turns within the hinge portions 186 and 190 and moves downwardly along the length of the bolts, which lowers the device 140. Moving the knurled knob in the opposite direction will raise the device 140.

Thus, there is provided a computer monitor viewing device which decreases eyestrain among users, shields users from radiation and effectively shields the monitor screen from unwanted viewers.

The above descriptions of preferred embodiments of devices provided in accordance with practice of principles of the present invention for viewing video display monitors, are for illustrative purposes. Because of variations which would be apparent to those skilled in the art, the present invention is not intended to be limited to the particular embodiments described above. The scope of the invention is described in the following claims.

What is claimed is:

1. A device for viewing a computer monitor screen comprising:
   a first mirror positioned to reflect an image from a computer monitor screen;
   means for supporting and positioning the first mirror;
   a second mirror positioned to reflect the image reflected by the first mirror toward the eyes of a viewer, wherein either the first or the second mirror is a partial mirror; and
   means for supporting and positioning the second mirror.

2. The viewing device of claim 1 wherein both the first and second mirrors are partial mirrors.

3. The viewing device of claim 1 wherein the first and second mirrors are positioned so that the total optical path length from the center of the face of the computer monitor screen to the center of the first mirror, from the center of the first mirror to the center of the second mirror, and from the center of the second mirror to the eyes of a viewer seated at a first position is about 9 to 15 inches longer than the optical path length from the face of the computer monitor screen to the eyes of the same viewer seated in the first position.

4. The device according to claim 1 wherein the viewing device is configured so that, when the device is in place for viewing the computer monitor screen, the distance from the center of the computer monitor screen to the center of the first mirror is from about 3 to about 5 inches, and the distance from the center of the first mirror to the center of the second mirror is from about 7 to about 11 inches.

5. The viewing device of claim 1 wherein at least one of the first and second mirrors is a front surface mirror.

6. The viewing device of claim 1 wherein both the first and second mirrors are partial front surface mirrors.

7. The viewing device of claim 1 mounted in place on a computer for viewing the computer monitor screen, and wherein the computer incorporates a movable keyboard, the support for positioning the second mirror being configured to enable the second mirror to be positioned adjacent the computer keyboard so that the image in the second mirror and the keyboard can be viewed simultaneously without moving the head.

8. The viewing device of claim 1 wherein the second mirror is positioned below the first mirror.

9. The viewing device of claim 1 further comprising a radiation shield to substantially block from the viewer the radiation emitted from the monitor.

10. The viewing device of claim 9 wherein the radiation shield is located between the back of the first mirror and the viewer.

11. The viewing device of claim 1 wherein the means for supporting and positioning the second mirror includes a support having a pivot thereon, the second mirror being mounted on the pivot for rotational movement about the pivot.

12. The viewing device of claim 1 wherein the means for supporting and positioning the first mirror and the means for supporting and positioning the second mirror are incorporated into a single mounting structure.

13. The viewing device of claim 12 wherein the single mounting structure is attached to a base member configured to support a computer monitor.

14. The viewing device of claim 13 wherein the base member comprises a thin, rigid member insertable between a computer and a computer monitor.

15. The viewing device of claim 12 wherein the single mounting structure includes a portion configured to support a computer monitor and to provide a storage space beneath the mounting structure.

16. The viewing device of claim 12 additionally comprising a pivot clamp assembly comprising a hinge attached to one side of the single mounting structure and means for mounting the hinge and mounting structure onto the side of the computer monitor.

17. The viewing device of claim 16 wherein the pivot clamp assembly hinge rotates about a hinge pin, and means are provided to adjust the force required to provide such rotation.

18. The viewing device of claim 17 wherein the pivot clamp assembly incorporates means to move the mounting structure along the height of the computer monitor screen.

19. The viewing device of claim 1 wherein the first mirror is positioned at approximately a 45° angle with a vertical axis.

20. The viewing device of claim 12 wherein the single mounting structure comprises a pair of sides which substantially shield the screen of the monitor when viewed from the sides of the screen.

21. The viewing device of claim 20 wherein the first mirror is larger than the second mirror.

22. The viewing device of claim 1 wherein the first and second mirrors are transparent front surface mirrors comprising a layer of black paint applied onto their back surfaces.

23. The viewing device of claim 1 wherein the second mirror has a concave or a convex reflective surface.

24. A device for viewing a computer monitor screen comprising:
a first front surface partial mirror positioned to reflect an image from a computer monitor screen;
means for supporting and positioning the first mirror;
a second front surface partial mirror positioned to reflect the image reflected by the first mirror toward the eyes of a viewer;
means for supporting and positioning the second mirror; and
a radiation shield located adjacent the back surface of the first mirror between the computer monitor screen and the viewer.

25. The viewing device of claim 24 wherein the means for supporting and positioning the first mirror and the means for supporting positioning the second mirror are incorporated into a single mounting structure.

26. The viewing device of claim 25 wherein the mounting structure includes means for adjusting the height of the first mirror relative to the height of the second mirror.

27. The viewing device of claim 25 wherein the first mirror is mounted in a housing and the first mirror-positioning means comprises a pair of channels on opposite sides of the mounting structure in which the mirror housing is slidably mounted, a resilient material being provided in at least one of the channels to frictionally engage the adjacent edge of the mirror housing to hold the housing in place.

28. The viewing device of claim 24 wherein the first mirror housing is mounted in the channels so as to position the mirror at about a 45° angle from vertical.

29. The viewing device of claim 24 wherein the second mirror is smaller than the first mirror, the means for supporting and positioning the second mirror includes a support having a pivot thereon, and the second mirror is mounted on the pivot for rotational movement about the pivot.

30. A device for viewing a screen of a computer monitor comprising:
a first mirror positioned to reflect an image from a computer monitor screen;
a second mirror positioned to reflect the image reflected by the first mirror toward the eyes of a viewer;
a mounting unit for positioning and supporting the first and second mirrors; and
a joining member for securing the mounting unit to the top and sides of a monitor, the joining member being detachable from the mounting unit and being secured between the monitor and mounting unit by means of hook and loop fasteners.

31. A device for viewing a screen of a computer monitor comprising:
a first mirror positioned to reflect an image from a computer monitor screen;
a second mirror positioned to reflect the image reflected by the first mirror toward the eyes of a viewer;
a mounting unit for positioning and supporting the first and second mirrors;
a hood for shielding a computer monitor screen from view from the top and the sides;
hook and loop fasteners to secure the hood to the mounting unit; and
hook and loop fasteners to secure the hood to the computer monitor.

32. A device for viewing a computer monitor screen comprising:
a first mirror positioned to reflect an image from a computer monitor screen;
a support for positioning the first mirror;
a lens for modifying the image reflected by the first mirror;
a second mirror shaped and positioned to reflect the image modified by the lens toward the eyes of a viewer; and
a support for positioning the second mirror.

33. The viewing device of claim 32 wherein the position of the second mirror is adjustable to accommodate viewer position and height.

34. The viewing device of claim 33 further comprising a friction brake for resisting the movement of the second mirror.

35. A device for viewing a screen of a computer monitor comprising:
a first mirror positioned to reflect an image from a computer monitor screen;
a second mirror positioned to reflect the image reflected by the first mirror toward the eyes of a viewer; and a mounting unit for positioning and supporting the first and the second mirrors, the mounting unit including a projection which is securable to the top of a computer monitor by means of a hook and loop fastener secured to the projection which mates with a hook and loop fastener secured to the top of the computer monitor to thereby hang the mounting unit from the monitor.

36. A device for viewing a computer monitor screen comprising:

a first mirror positioned to reflect an image from a computer monitor screen;
means for supporting and positioning the first mirror;
a second mirror positioned to reflect the image reflected by the first mirror toward the eyes of a viewer, wherein either the first or the second mirror is a front surface mirror; and
means for supporting and positioning the second mirror; and
at least one of the mirrors is a partial mirror.

37. The viewing device of claim 36 wherein both the first and second mirrors are front surface mirrors.

* * * * *